April 20, 1926.  
R. L. CARTER  
1,581,720  
FLEXIBLE SHOE FOR ROUTING MACHINES  
Filed Feb. 16, 1925
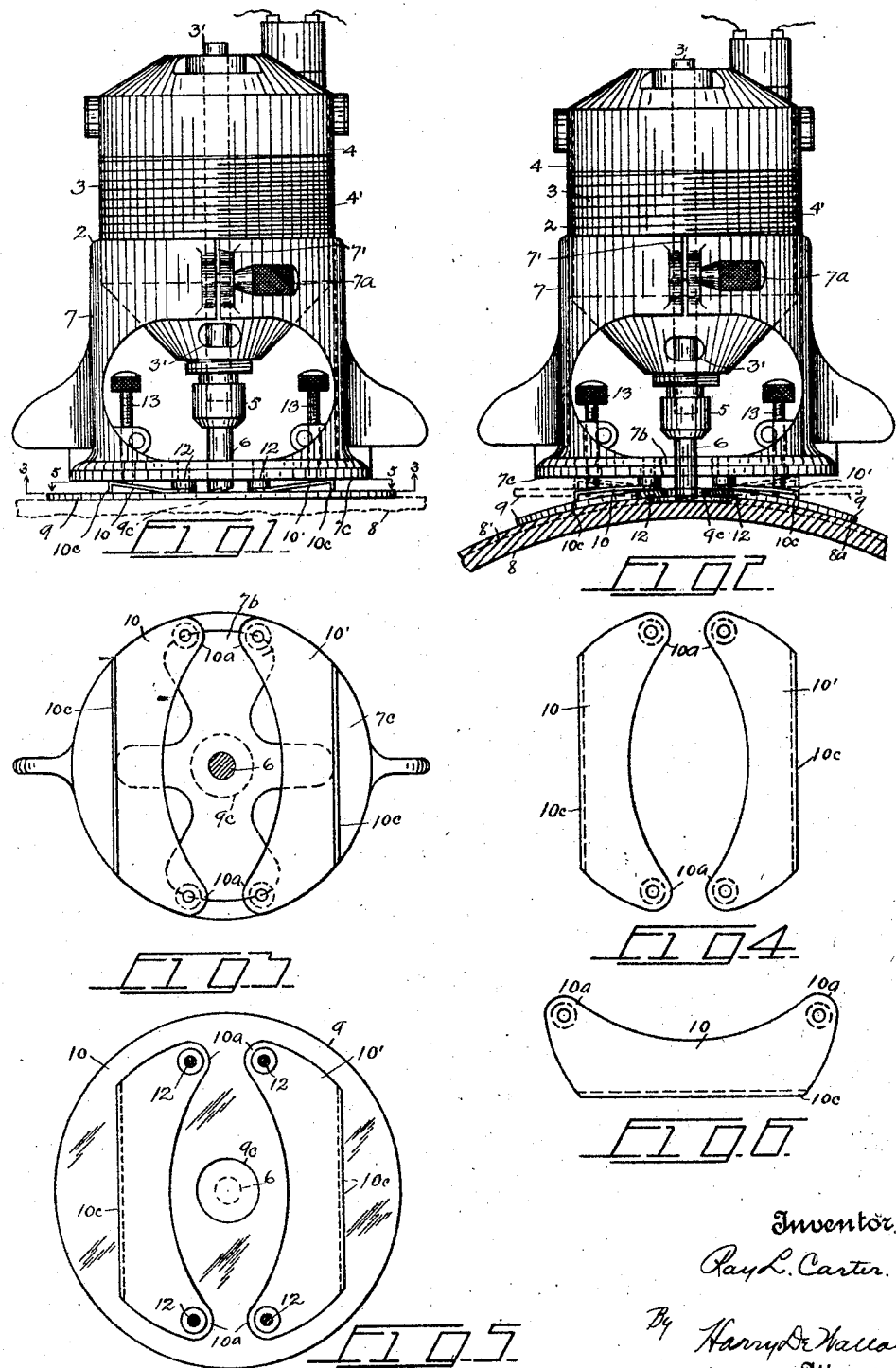

Patented Apr. 20, 1926.

1,581,720

UNITED STATES PATENT OFFICE.

RAY L. CARTER, OF SYRACUSE, NEW YORK.

FLEXIBLE SHOE FOR ROUTING MACHINES.

Application filed February 16, 1925. Serial No. 9,618.

*To all whom it may concern:*

Be it known that I, RAY L. CARTER, a citizen of the United States, residing at Syracuse, in the county of Onondaga and State of New York, have invented certain new and useful Improvements in Flexible Shoes for Routing Machines, of which the following is a specification.

This invention relates to portable routing and shaping machines, and has for its object to provide novel means for preventing the machine and its holder from abrading or otherwise marring and injuring delicate or finished surfaces of the work. A particular object is to provide a flexible shoe for use in connection with routing machines employed by printers and pressmen for routing cylindrical or flat stereotype plates, wherein the routers are moved frictionally over the relatively soft lead-like impression faces of the type, and deface or mar and render the plates unfit for printing. A further object is to provide a shoe of the class adapted for mounting upon the bottom plane face of the router holder, the said shoe preferably comprising celluloid or like tough flexible and non-abrading material, which may be readily and quickly adjusted to conform to cylinders of varying diameters, and which may be restored to its normal flat condition by its own tension. A further object is to provide a plurality of flexible plates which are preferably interposed between the holder of the router and the shoe, and by means of which curvature of the shoe may be varied at will. And a further object is to provide means for flexing the plates and the shoe and for holding said parts in various adjusted positions.

The various features and parts of the invention will be understood from the detailed description which follows, and by reference to the accompanying drawings, in which—

Figure 1 is an elevational view of a complete routing machine and its holder, to which my improvement is applied. Fig. 2 is a similar view showing the shoe and related parts bent to conform to a stereotype cylinder or other curved surfaces. Fig. 3 is a bottom face view of the router holder, taken on line 3—3 of Fig. 1; showing the flexible metal plates by which the shoe is flexed. Fig. 4 is a top plan view of the spring plates. Fig. 5 is a horizontal section taken on line 5—5 of Fig. 1 showing the spring plates in relation to the shoe. And Fig. 6 is a top face view of one of the plates.

In the drawing, 2 represents generally a portable routing machine comprising a motor 3 having an armature shaft 3'. The motor is usually enclosed in a cylindrical casing 4, which is shown externally threaded at 4'. The armature shaft 3' preferably projects above and below the casing 4, and its lower end is arranged to support the usual chuck 5, which holds the routing tool, as 6. The motor and its casing are supported by a hollow cylindrical holder 7, which is split, as at 7', and may be clamped to the casing 4, by means of a screw $7^a$. The routing machine may be adjusted axially in the holder, as shown by comparing Figs. 1 and 2, for moving the tool 6 towards and away from the work, as 8. The bottom $7^c$ of the holder comprises a plane horizontal surface, and for ordinary routing or shaping work this bottom surface directly engages a surface of the work to be operated upon by the tool 6. The central bottom portion of the base $7^c$ is usually cut away, as at $7^b$, for clearance and observation of the tool 6.

The present routing machine is designed particularly for use by printers or printing-press tenders, for routing or cutting away portions of the impression surfaces, as well as for deepening the blank portions of stereotype cylinders, as 8, such for example, as are employed in connection with rotary presses, by which newspapers, magazines and the like are printed. Fig. 2 shows the tool 6 in the act of routing or mortising the printing face of such a cylinder, as indicated at 8'. In this figure of the drawing the broken line $8^a$ indicates the usual clearance or depressions between the body of the cylinder and the impression surface of the type, and the tool 6 is shown cutting away a portion of the projecting type for eliminating certain matter from the cylinder, or for the insertion of corrected matter.

My invention relates particularly to means for protecting the face of the type of cylinder 8, from injury by marring which invariably results from the frictional contact of the harder metal of the base $7^c$ with the relatively soft composition of the stereotype plate 8. To this end, I provide a non-metallic shoe, which may comprise a celluloid or like non-abrading disc 9, the said disc preferably being of such flexibility as to be readily bent or curved to conform to the curvature of the cylinder 8, as shown in Fig. 2. The shoe 9 should be of such nature that when the pressure which effects the curving of the disc is relaxed, the disc will spring back to its normal horizontal or flat state, as shown in Fig. 1. The disc 9 being relatively broad and readily flexible in different portions independently of the other portions, requires suitable means for correspondingly flexing its opposite sides, preferably by pressure means that act on lines that are parallel to each other. For this purpose, I provide similar oppositely arranged spring metal plates 10—10′ of peculiar shape, each of said plates being formed with perforated extremities, as 10ᵃ, which are arranged parallel to each other, and are preferably spaced apart, as best seen in Figs. 3, 4 and 5. The corresponding outer margins of plates 10 are bent downwardly for forming elongated straight vertical lips or flanges as 10ᶜ, which ride upon the top face of the shoe 9. By this construction and arrangement, the plates 10 may be flexed downwardly, for effecting the corresponding curving of the opposite side of the shoe, as shown in Fig. 2. The plates 10 are mounted on the top face of the shoe 9, and these parts are rigidly held together by means of common posts or studs 12. The posts 12 are supported by the base 7ᶜ of the holder, the latter being perforated to receive the reduced upper ends of said studs, as shown in Figs. 1 and 2. The lower ends of the posts 12 are also reduced, and these portions pass through perforations in the plates, and also through corresponding perforations in the shoe 9, after which the ends of the posts are peened or battered in the usual manner for riveting the parts together. The enlarged medial portions of the posts 12 serve to suitably space the plates 10, from the base 7ᶜ. The plates 10 are preferably bent upwardly slightly at their free edges, so as to normally engage the bottom face of the base 7ᶜ by their own tension, as shown by full lines in Fig. 1 and by dotted lines in 2, and the lips 10ᶜ are preferably of such depth as to allow the shoe to assume its true horizontal position parallel to the base 7ᶜ, and to be supported in the latter position against further upward flexing by the weight of the machine, when the latter is being operated over substantially plane or level surfaces. The adjustment of the shoe 9 and the plates 10 vertically is effected by set-screws 13, which are disposed at the opposite sides of the tool 6 within the hollow holder, as shown in Figs. 1 and 2. These screws are operable in vertical threaded holes, and their lower ends frictionally engage the tops of the plates 10, upon which they may rotate without danger of injuring the softer material of the shoe 9. The screws 13 are arranged to engage the plates near the lips 10ᶜ, where the said plates are stiffest, and therefore effect the depression of the free outer margins of the plates, in a manner to prevent wobbling or rocking of the plates. This insures the like bending and holding of the corresponding margins of the shoe true to the cylinder 8, as shown. The shoe is formed with a central perforation 9ᶜ, through which the tool 6 plays. When the shoe is made out of transparent celluloid the operator may observe the outlines of the work beyond the perforation 9ᶜ. But when opaque shoes are employed, the perforation 9ᶜ should be considerably larger than shown. Only one size cylinder 8 is shown in the drawing, but it will be readily understood that the shoe 9 and the plates 10 may be flexed to a greater or less extent than herein shown, by the manipulation of the screws 13, for adjusting the shoe for suitably conforming to and routing cylinders of greater or less curvature.

Having thus described my invention, what I claim, is—

1. In a machine for routing plane and curved surfaces, the combination with a motor and a tool driven thereby, and a holder in which said motor may be adjusted axially, of a disc-shaped shoe composed of celluloid or like non-abrading material mounted below said holder adapted to directly engage the work, means for rigidly securing the shoe at substantially diametrically opposite points to the bottom face of the holder, and means freely slidably engaging the shoe for correspondingly flexing the opposite margins of said shoe away from the holder for shaping the shoe to the curvature of cylinders of different diameters, the said shoe adapted to be restored to its normal flat state when the said flexing pressure is relaxed.

2. The combination with a routing machine including a tool and a holder therefor, said holder having a plane bottom provided with an opening through which the tool may be projected, a plurality of spring metal plates having confronting edges rigidly secured at their inner sides to the bottom face of said holder, the opposite sides of said plates being free and formed with depending flanges that parallel each other, a flexible shoe disposed beneath said plates, said shoe being rigidly secured at substantially diametrically opposite points to said plates and frictionally engaging said depending flanges, and screws carried by said holder adapted to depress the flange margins of said plates and the corresponding portions of said shoe until the curvature of said shoe agrees with the curvature of a stereotype or other cylinder.

3. The combination with a routing machine including a routing tool, and a holder for said machine having an open bottom through which the tool plays, of a shoe interposed between the bottom of said holder and the work, said shoe comprising a disc of non-abrading material adapted to be bent to conform to the curvature of cylindrical sterotype plates and the like, flexible members interposed between said shoe and the bottom of said holder, unitary means for securing the shoe at substantially diametrically opposite points and the ends of said members to the holder, and means carried by the holder adapted to depress said members and the corresponding portions of said shoe for bending the shoe to conform to the curvature of the sterotype plates.

4. The combination with a routing machine including a motor and a tool driven thereby, and a holder for said machine having a plane bottom adapted to support the machine on the work, of means for preventing the hard bottom of the holder from scratching or marring the work comprising a circular flexible shoe, said shoe being composed of non-abrading material and adapted to be interposed between the holder and the work, a pair of similar spring metal plates interposed between said shoe and the bottom of the holder, said plates being disposed parallel to each other in a common plane and having confronting edges rigidly secured at the ends of the inner sides to the holder and also to said shoe, the outer sides of said plates being free and formed with similar depending lips that normally contact with the top surface of the shoe, and means carried by the holder and engaging the tops of said plates adapted to depress said plates and to flex said shoe until the bottom face of the shoe conforms to the curvature of the work, said shoe adapted to spring upwardly towards the holder by its own tension when the pressure of said flexing means is relaxed.

5. The combination with a routing machine including a motor and a tool driven thereby, and a holder for said motor having a plane bottom, of a pair of spring metal plates secured to the bottom of the holder, said plates being disposed in a common plane parallel to each other and having free portions formed with similar depending flanges, a celluloidal disc secured to and overlaying the bottom faces of said plates, the top surface of said disc being in constant engagement with said flanges and portions of said disc adapted to be correspondingly flexed downwardly to conform to the curvature of a cylindrical piece of work, the tension of said plates and said disc adapted to be exerted for normally holding said disc substantially parallel to the bottom of the holder, and means carried by the holder adapted to effect the depression of said disc and said plates.

6. In means for preventing routing machines and the like from marring or mutilating the impression surfaces of stereotype plates, the combination with a motor and a routing tool driven thereby, and a holder in which said motor may be adjusted axially for engaging the work, of a flexible shoe comprising a non-abrading material interposed between the bottom of the holder and the work, posts for normally supporting the shoe from substantially diametrically opposite points parallel to the bottom of the holder, flexible plates interposed between the shoe and the bottom of the holder, said plates being disposed at the opposite sides of the tool and being rigidly supported by said posts, said plates having free portions in constant contact with the corresponding portions of the shoe, and screws carried by said holder and engaging said plates adapted to effect the downward curving of the opposite margins of said shoe.

7. In combination with a routing machine, a flexible shoe, means to secure the shoe at approximately diametrically opposite points to the bottom of the machine, a pair of confronting shoe-flexing members having inner sides secured to the machine bottom and having free outer portions formed with projections which latter engage the upper face of the shoe and means to effect predetermined sliding movement of the projections on and against the shoe so as to affect flexing of diametrically opposed portions thereof.

In testimony whereof I affix my signature.

RAY L. CARTER.